United States Patent
Jiang et al.

(10) Patent No.: US 10,339,263 B2
(45) Date of Patent: Jul. 2, 2019

(54) ELECTRONIC COMPONENT FOOTPRINT VERIFICATION SYSTEM AND A METHOD THEREOF

(71) Applicant: FootPrintKu Inc., Kaohsiung (TW)

(72) Inventors: Yu-Siang Fan Jiang, Kaohsiung (TW); Mong-Fong Fan Horng, Kaohsiung (TW); Yan-Jhih Wang, Kaohsiung (TW); Jun-Qiang Wei, Kaohsiung (TW); Yi-Ting Chen, Kaohsiung (TW)

(73) Assignee: Footprintku Inc., Kaohsiung (TW)

( * ) Notice: Subject to any disclaimer, the term of this patent is extended or adjusted under 35 U.S.C. 154(b) by 0 days.

(21) Appl. No.: 15/671,347

(22) Filed: Aug. 8, 2017

(65) Prior Publication Data

US 2019/0050518 A1 Feb. 14, 2019

(51) Int. Cl.
*G06F 17/50* (2006.01)
*G06F 16/23* (2019.01)

(52) U.S. Cl.
CPC .......... *G06F 17/5081* (2013.01); *G06F 16/23* (2019.01); *G06F 17/509* (2013.01); *G06F 17/5072* (2013.01); *G06F 17/5068* (2013.01); *G06F 2217/04* (2013.01); *G06F 2217/74* (2013.01)

(58) Field of Classification Search
CPC .. G06F 17/50; G06F 17/5045; G06F 17/5068; G06F 17/5081
USPC .................................................. 716/137, 106
See application file for complete search history.

(56) References Cited

U.S. PATENT DOCUMENTS

2007/0038967 A1* 2/2007 Brathwaite ............. G06F 17/50
716/102
2015/0302130 A1* 10/2015 Hirschman ......... G06F 17/5072
716/137

* cited by examiner

*Primary Examiner* — Paul Dinh
(74) *Attorney, Agent, or Firm* — Muncy, Geissler, Olds & Lowe, P.C.

(57) ABSTRACT

An electronic component footprint verification system and a method thereof are provided in the present disclosure. The system is available to an external user for selecting an electronic component footprint to be verified, reading a verification rule checklist in an external database, extracting characteristics of the electronic component footprint, accessing characteristic data from the electronic component footprint, verifying the characteristic data based on the verification rule checklist, and displaying a verification result.

10 Claims, 5 Drawing Sheets

ELECTRONIC COMPONENT FOOTPRINT VERIFICATION SYSTEM AND A METHOD THEREOF

BACKGROUND OF THE INVENTION

1. Field of the Invention

The present disclosure relates to an electronic component footprint verification system and a method thereof.

2. Description of the Prior Art

A circuit layout engineer usually draws footprints of electronic components with pads, creating a footprint database during the PCB layout process for follow-up circuit layouts.

Currently, most drawing files for footprints of electronic components with pads which are fully created should be checked manually for any existing mistakes. However, the manual inspection to check the correctness of footprints of electronic components with pads in the verification process poses a risk to PCB design and manufacturing because the inspection is unable to deal with new and continuously emerging electronic components.

The present disclosure provides a solution for PCB layouts without the above-mentioned problems.

SUMMARY OF THE INVENTION

A technical solution to execute electronic component footprint verification automatically is provided in the present disclosure.

To this end, the present disclosure relates to an electronic component footprint verification system. The system includes a user interface, a setup regulation module, an application programming interface setup instruction module, a characteristic extraction module, a data processing module and a component footprint verification module. The user interface is available to an external user and is used to select an electronic component footprint to be verified. The electronic component footprint conforms to file formats of a corresponding circuit layout system. The setup regulation module connected to the user interface is used to read a verification rule checklist in an external database as a verification basis in the future. The application programming interface setup instruction module provides an application programming interface by which a circuit layout system is accessed. The characteristic extraction module is used to extract characteristics of the electronic component footprint. The data processing module is connected to the user interface, the application programming interface setup instruction module and the characteristic extraction module for operating the application programming interface as well as the characteristic extraction module and accessing characteristic data from the electronic component footprint. The component footprint verification module connected to the user interface is used to verify the characteristic data according to the verification rule checklist for the display of a verification result on the user interface.

The present disclosure further provides a method of an electronic component footprint verification system. The method includes the following steps: select an electronic component footprint which is to be verified and corresponds to file formats of a corresponding circuit layout system; read a verification rule checklist in an external database as a verification basis in the future; provide an application programming interface by which the circuit layout system is accessed; characteristic data is extracted from the electronic component footprint through the application programming interface; the characteristic data is verified according to the verification rule checklist for the display of a verification result.

In summary, according to the inventive subject matter, an electronic component footprint verification system and a method thereof are applicable to automatic verification of electronic component footprints by analyzing and checking characteristic data of an electronic component footprint.

BRIEF DESCRIPTION OF THE DRAWINGS

The technical content, purposes and effects of an electronic component footprint verification system and a method thereof in the present disclosure are further explained in preferred embodiments and accompanying drawings which are shown as follows.

DETAILED DESCRIPTION OF THE PREFERRED EMBODIMENTS

An electronic component footprint verification system and a method thereof are explained in preferred embodiments; however, these embodiments should not be considered as examples to limit the scope of the patent application.

Figure 1:
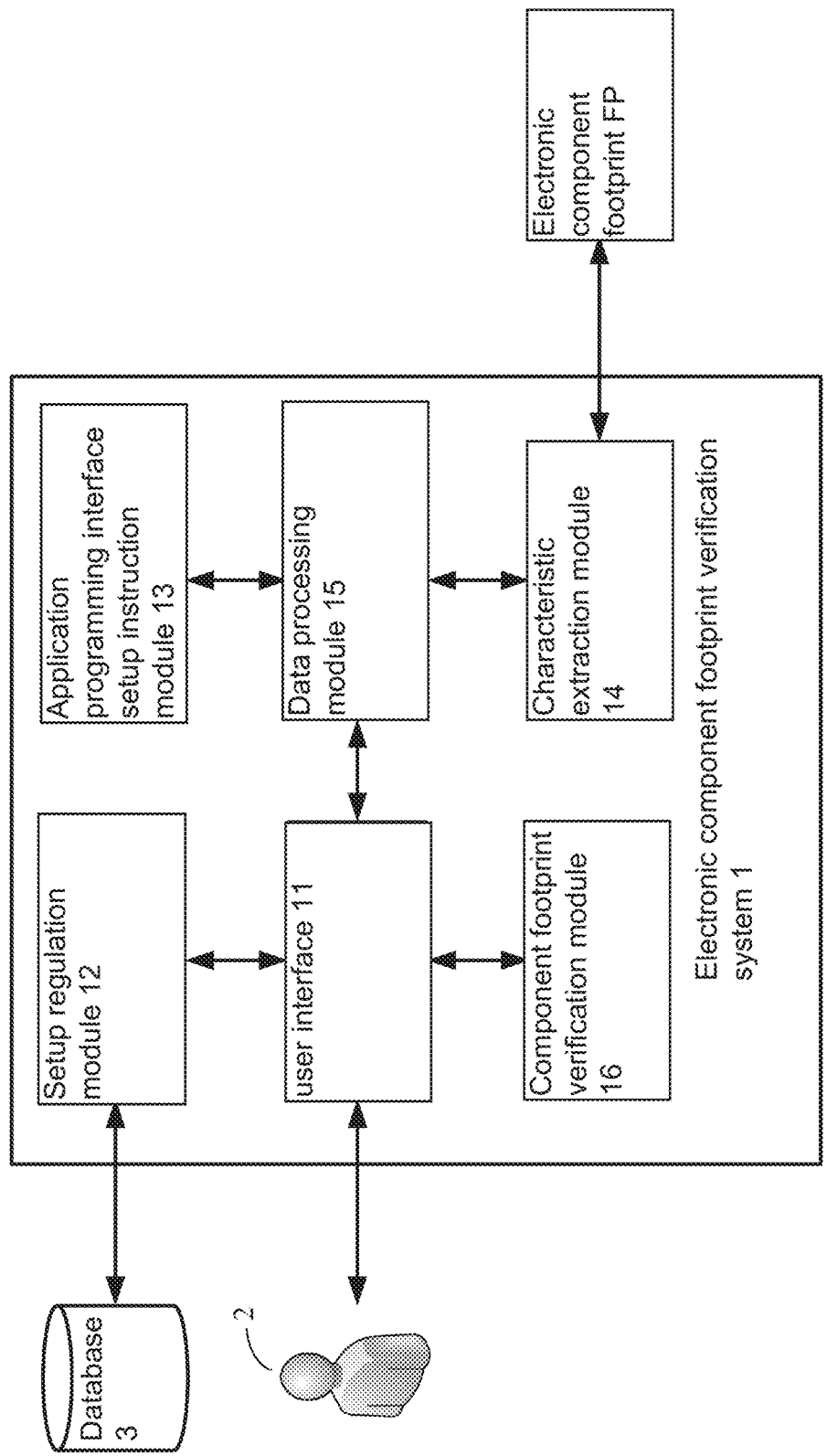
FIG. 1 is a block diagram of an electronic component footprint verification system according to a first embodiment.

Referring to FIG. 1, which is a block diagram of an electronic component footprint verification system 1 in the first embodiment. The system includes a user interface 11, a setup regulation module 12, an application programming interface setup instruction module 13, a characteristic extraction module 14, a data processing module 15 and a component footprint verification module 16. The user interface 11 is available to an external user 2 for selecting an electronic component footprint FP (FIG. 5) to be verified wherein the electronic component footprint FP conforms to file formats of a corresponding circuit layout system. The setup regulation module 12 connected to the user interface 11 is used to read a verification rule checklist in an external database 3 as a verification basis in the future. The application programming interface setup instruction module 13 provides an application programming interface by which a circuit layout system is accessed. The characteristic extraction module 14 is used to extract characteristics of the electronic component footprint FP. The data processing module 15 is connected to the user interface 11, the application programming interface setup instruction module 13 and the characteristic extraction module 14 for operating the application programming interface as well as the characteristic extraction module 14 and accessing characteristic data from the electronic component footprint FP. The component footprint verification module 16 connected to the user interface 11 is used to verify the characteristic data according to the verification rule checklist for the display of a verification result on the user interface 11.

In another embodiment, the verification rule checklist further includes at least one of the following: pin design rules, pin-to-pin spacing rules, assembly rules, silkscreen rules, DFA (Design For Assembly) bound rules, probe contact rules, place bound rules, body center rules, and footprint information rules.

The user interface 11, the setup regulation module 12, the application programming interface setup instruction module 13, the characteristic extraction module 14, the data processing module 15 and the component footprint verification module 16 in the electronic component footprint verification system 1 are provided with a software module executed in a processor or a chip with programmable digital circuits. The circuit layout system is a software program for PCB (printed circuit board) circuit layouts for example PCB design software, such as without limitation, Protel, OrCAD, and Allegro. In a further embodiment, the electronic component footprint is a footprint of an electronic component mounted on a PCB.

In yet another embodiment, the data processing module 15 is used to normalize the characteristic data. In yet a further embodiment, the normalization is to transform the characteristic data to another file format including, without limitation, JSON (JavaScript Object Notation) and XML (Extensible Markup Language). In still a further embodiment, the characteristic data includes at least one of the following: pin-out information, geometric pattern information, and text description information of the corresponding electronic component footprint.

Figure 2:
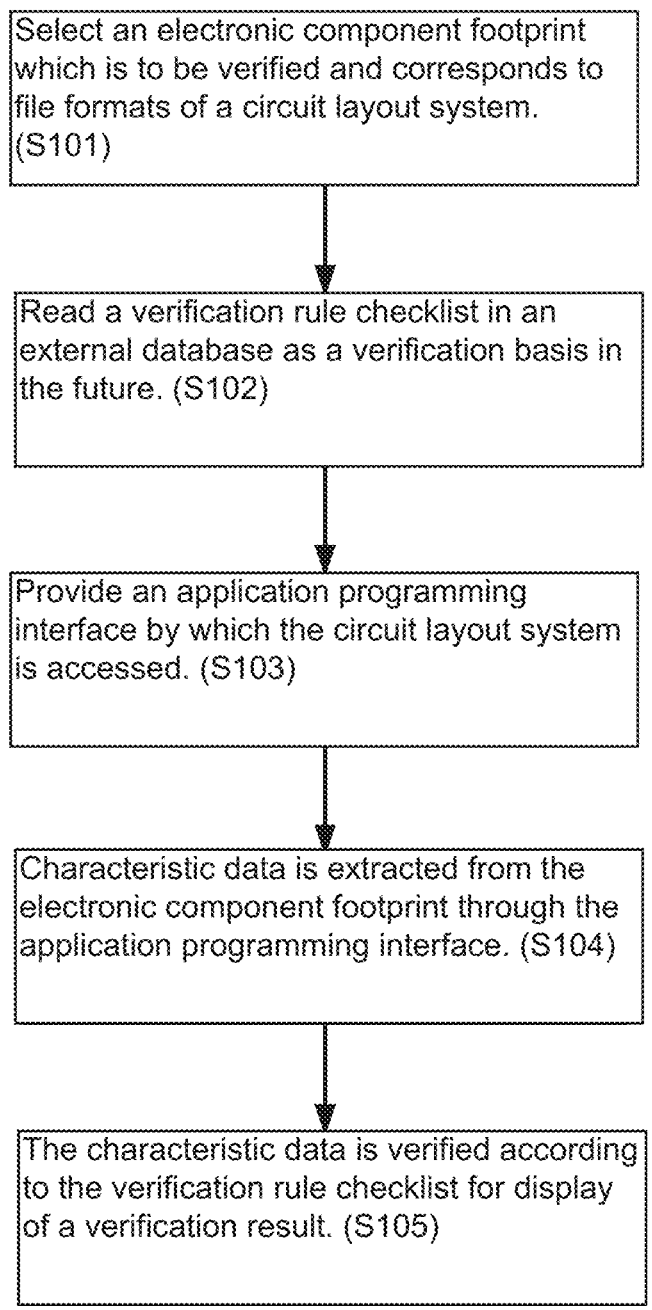
FIG. 2 is a flow chart for a method of an electronic component footprint verification system according to a second embodiment.

Referring to FIG. 2, which is a flow chart for a method of an electronic component footprint verification system in the second embodiment. The method is comprised of the following steps:

S101: select an electronic component footprint which is to be verified and corresponds to file formats of a circuit layout system.

S102: read a verification rule checklist in an external database as a verification basis in the future.

S103: provide an application programming interface by which the circuit layout system is accessed.

S104: characteristic data is extracted from the electronic component footprint through the application programming interface.

S105: the characteristic data is verified according to the verification rule checklist for the display of a verification result.

In another embodiment, the verification rule checklist in the method further includes at least one of the following: pin-out design rules, pin-to-pin spacing rules, assembly rules, silkscreen rules, DFA (Design For Assembly) bound rules, probe contact rules, place bound rules, body center rules, and footprint information rules. In a further embodiment, the method is used in the normalization of the characteristic data. In yet another embodiment, the normalization in the method is to transform the characteristic data to another format including, without limitation, JSON (JavaScript Object Notation), XML (Extensible Markup Language) and other equivalents. In still a further embodiment, the characteristic data in the method further includes at least one of the following: pin-out information, geometric pattern information, and text description information of the corresponding electronic component footprint.

Figure 3:
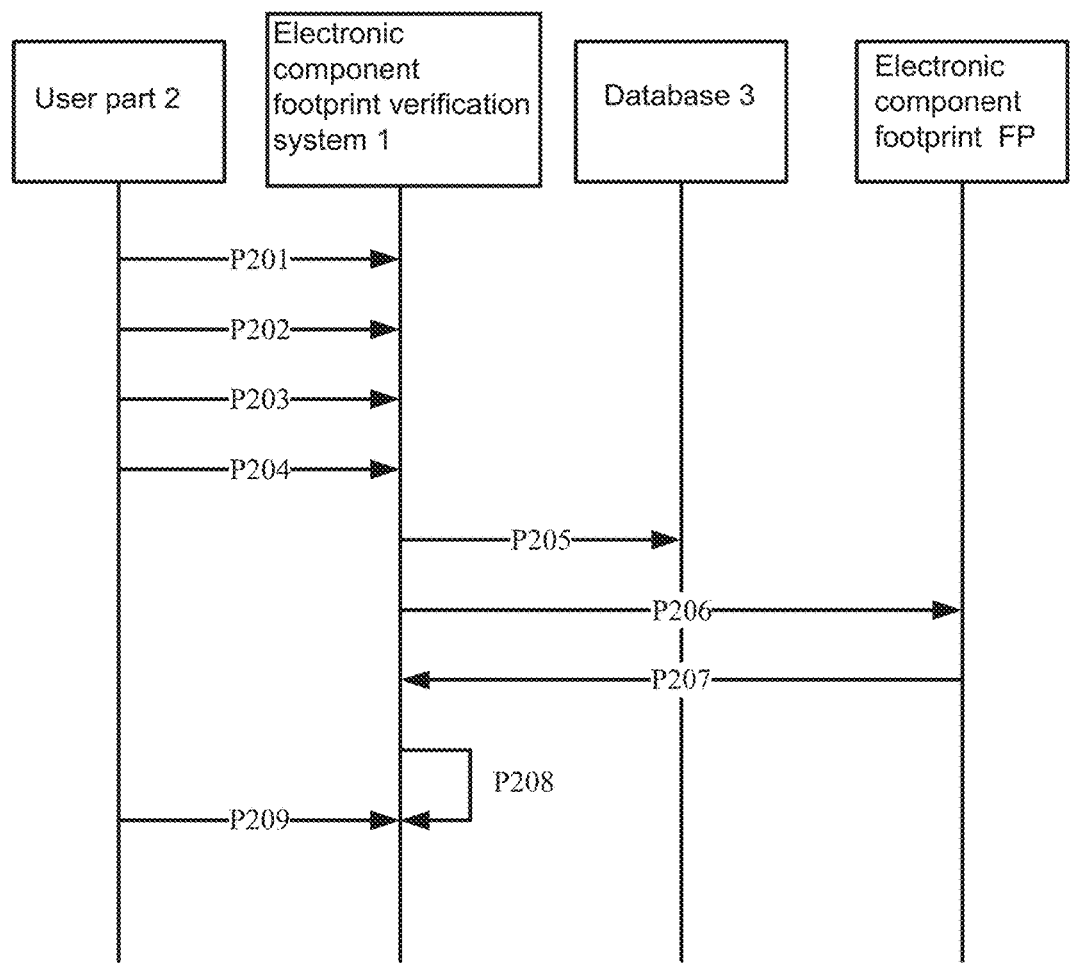
FIG. 3 is a sequence diagram for the operation of an electronic component footprint verification system.

An electronic component footprint verification system 1 in the present disclosure is explained in the first embodiment; moreover, a method of an electronic component footprint verification system in the second embodiment features equivalent or similar technical effects. Referring to FIG. 3, which is a sequence diagram for the operation of the electronic component footprint verification system 1. FIG. 3 describes the following steps:

P201: an electronic component footprint to be verified is selected by a user 2 through the electronic component footprint verification system 1.

P202: information of the electronic component footprint is entered by the user 2 through the electronic component footprint verification system 1.

P203: setup regulations are selected by the user 2 through the electronic component footprint verification system 1.

P204: a verification process is executed by the electronic component footprint verification system 1.

P205: setup regulations are queried in a database 3 by the electronic component footprint verification system 1.

P206: characteristics of the designated electronic component footprint FP are extracted by the electronic component footprint verification system 1.

P207: the characteristic data of the electronic component footprint FP is accessed by the electronic component footprint verification system 1.

P208: a verification process is executed by the electronic component footprint verification system 1 according to the setup regulations.

P209: a verification result is shown on a display interface for the user 2 by the electronic component footprint verification system 1.

In P201~P204 of the sequence diagram, the user 2 is able to choose an electronic component footprint to be verified, setup regulations, component assembly information, component information, etc. on the user interface 11.

Then, the user 2 is able to select or enter pad parameters of an electronic component including, without limitation, pad type, pad shape, pad size, pad-to-pad spacing, pad-to-assembly spacing, plated or non-plated type, margin of error, and special mark (for example, the first pad marked as Pin 1). The pad type selectable herein includes for example SMD (surface-mount devices), DIP (dual in-line package), Via, and others.

Figure 4:
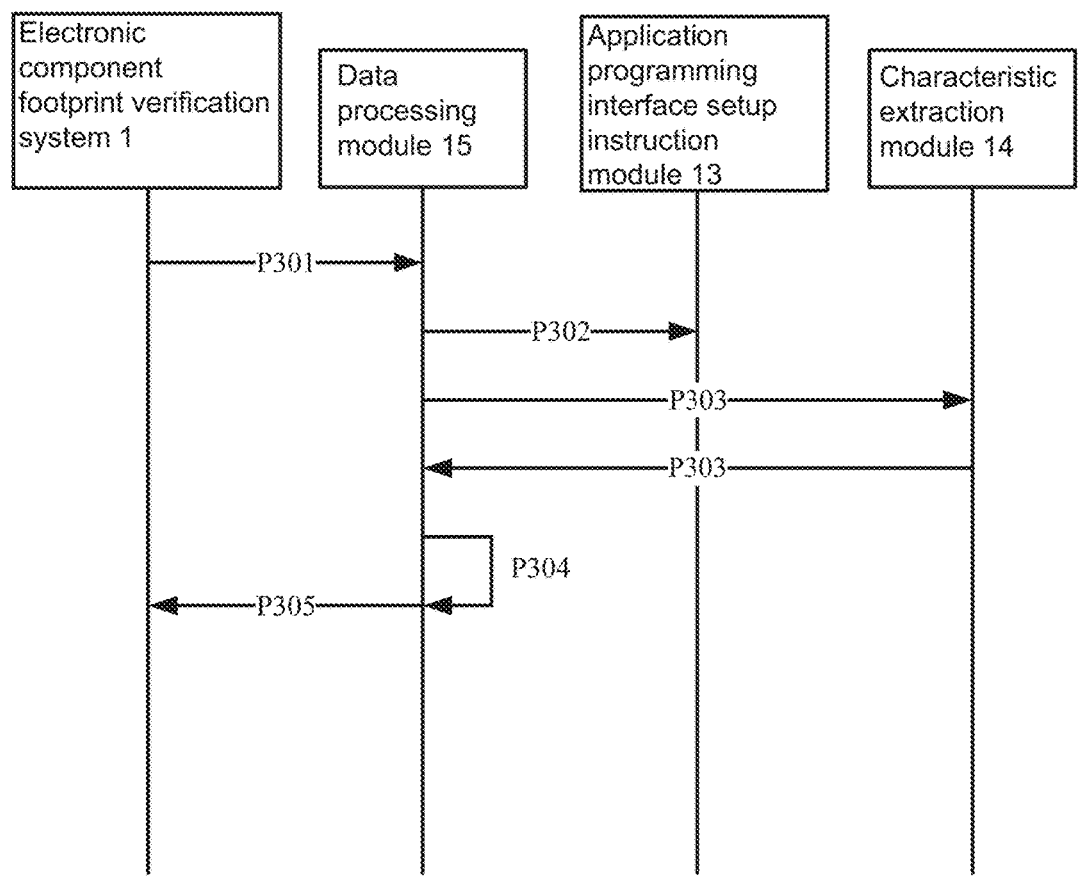
FIG. 4 is a sequence diagram for a reading process of an electronic component footprint verification system.

In P205 of the sequence diagram, the electronic component footprint verification system 1 issues SQL instructions to the database 3 for reading a designated verification rule checklist. To read the file content of a specific circuit layout system, the electronic component footprint verification system 1 provides an application programming interface (API) at the application programming interface setup instruction module 13 to access multiple circuit layout systems in a reading process (FIG. 4) with detailed steps as follows:

P301: the characteristic data of the footprint is accessed by the data processing module 15 according to the instructions of the electronic component footprint verification system 1.

P302: a designated API instruction is provided by the application programming interface setup instruction module 13 according to instructions of the data processing module 15.

P303: the characteristic data of the footprint is accessed by the characteristic extraction module 14 according to instructions of the data processing module 15.

P304: the data format of the characteristic data of the footprint is transformed by the data processing module 15.

P305: the characteristic data of the footprint conforming to the data the format of JSON is sent back by the data processing module 15.

The data file format of JSON includes pin-out information, geometric pattern information and text description information: the pin-out information records pin-out names, pin-out coordinates, pin-out numbers, and PCB layer sizes/shapes; the geometric pattern information records information of pads in each PCB layer as well as layer data and object attributes of a corresponding circuit layout system, for example, line segment & shaped segment, starting point coordinate, end point coordinate, etc.; the text description information records text content, text coordinate, text angle, text direction, text size, space occupied by texts, etc.

Figure 5:
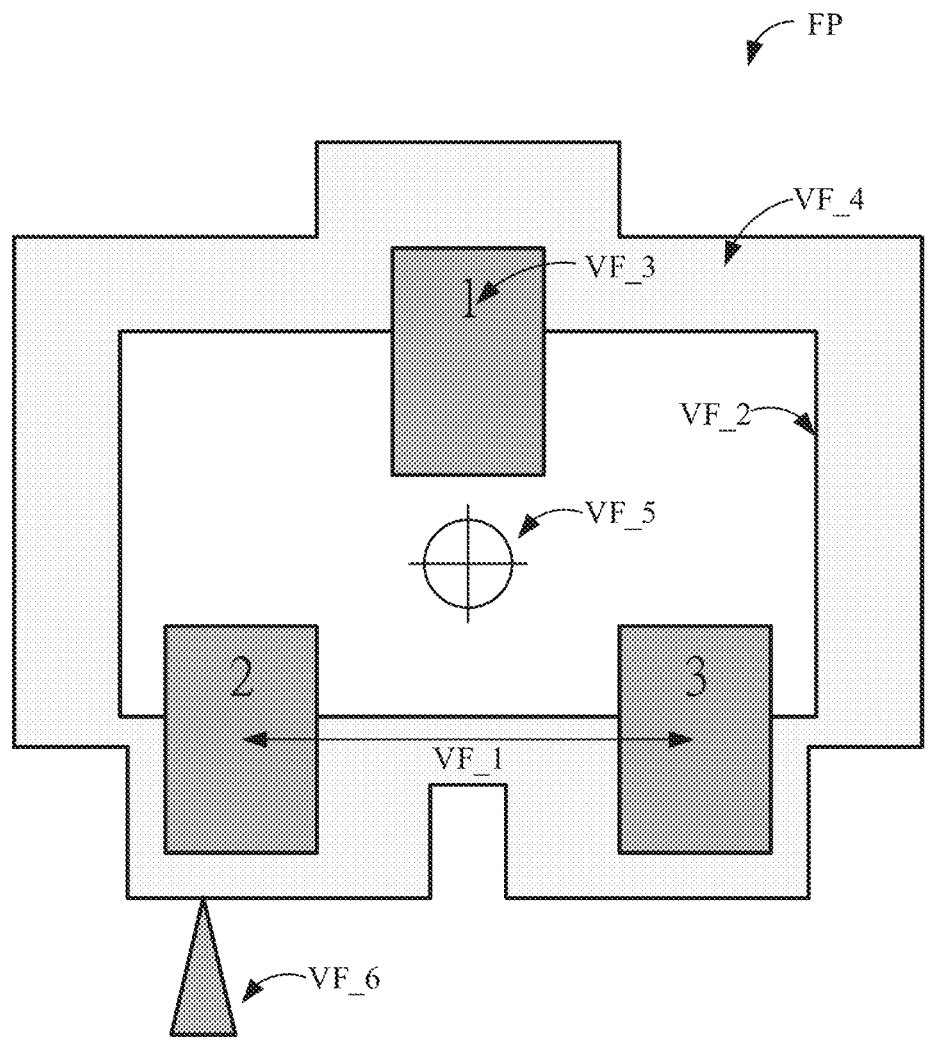
FIG. 5 is a schematic view of fully created electronic component footprint.

To ensure the electronic component footprint is correct and without errors, the component footprint verification module 16 verifies the following items. For convenience, the schematic view of the electronic component footprint FP in FIG. 5 is explained hereafter:

LIST_1: Pin-out verification (Verification No.: VF_1) to verify pin-out name, pin-out layer and pin-to-pin spacing.

LIST_2: Assembly verification (Verification No.: VF_2) to verify an assembly's total length and width.

LIST_3: Silkscreen verification (Verification No.: VF_3) to verify the location of a line segment as well as the distance between a line segment and a pin-out and check the safe distance between any two pads of a component in addition to an assembly's identical position (VF_2).

LIST_4: Dfa_Bound verification to verify an assembly described and pad areas (Dfa_Bound must match VF_1 and VF_2).

LIST_5: Place_Bound verification (Verification No.: VF_4) which is similar to Dfa_Bound verification wherein Dfa_Bound amplified is equivalent to Place_Bound (Place_Bound is greater than Dfa_Bound according to rules) and Place_Bound verification is applicable to verifying a component's height.

LIST_6: No_Probe verification which is similar to Place_Bound verification but not available for verification of a component's height.

LIST_7: Body Center verification (Verification No.: VF_5) is to verify the label at the body center by displaying information such as text content, text graphics, and the electronic component footprint's central coordinates.

LIST_8: Footprint Information verification to verify correctness of footprint information.

LIST_9: Sign verification (Verification No.: VF_6) is to verify a labeled component's functional characteristics such as pad sequence, direction to mount a connector, PCB edge, and the component's properties and functions.

LIST_10: Keep out verification is to verify descriptions of one component for a PCB process such as structure and property which induce some restrictive conditions in the process.

The above examples are used to explain feasible embodiments in the present disclosure; however, the embodiments are not intended to limit the scope of the patent application. Any equivalent modification or change without departing from the spirit of the present disclosure should be incorporated in the claims thereinafter.

Many changes and modifications in the above described embodiment of the invention can, of course, be carried out without departing from the scope thereof.

What is claimed is:

1. An electronic component footprint verification system, comprising:
    a user interface available to an external user for selecting an electronic component footprint to be verified, wherein the electronic component footprint corresponds to file formats of a corresponding circuit layout system;
    a setup regulation module connected to the user interface for reading a verification rule checklist in an external database, wherein the verification rule checklist includes a pin-out verification rule and an assembly verification rule, the pin-out verification rule is provided for verifying pin-out names, pin-out layers, and pin-to-pin spacings, and the assembly verification rule is provided for verifying total length and width of an assembly;
    an application programming interface setup instruction module for providing an application programming interface by which a circuit layout system is accessed;
    a characteristic extraction module used for extracting characteristics of the electronic component footprint;
    a data processing module connected to the user interface, the application programming interface setup instruction module and the characteristic extraction module for operating the application programming interface and the characteristic extraction module and for instructing the characteristic extraction module to extract characteristic data from the electronic component footprint, wherein the characteristic data comprises pin-out information and geometric pattern information, the pin-out information includes PCB layer sizes and shapes, and the geometric pattern information includes information of pads in each PCB layer and layer data and object attributes of the corresponding circuit layout system; and
    a component footprint verification module connected to the user interface for verifying the characteristic data according to the verification rule checklist and for displaying a verification result on the user interface.

2. The electronic component footprint verification system as claimed in claim 1, wherein the verification rule checklist further comprises a silkscreen verification rule, a Dfa (design for assembly) bound verification rule, a place bound verification rule, a body center verification rule, a footprint information verification rule, a sign verification rule, and a keep-out verification rule, the silkscreen verification rule is provided for verifying location of a line segment, a distance between a line segment and a pin-out, safe distance between any two pads of a component, and assembly's identical position, the Dfa bound verification rule is provided for verifying an assembly described and pad areas, the place bound verification rule is provided for verifying height of a component, the body center verification rule is provided for verifying a label at a body center, the footprint information verification rule is provided for verifying correctness of footprint information, the sign verification rule is provided for verifying functional characteristics of a labeled component, and the keep-out verification rule is provided for verifying descriptions of a component for a PCB process.

3. The electronic component footprint verification system as claimed in claim 1, wherein the data processing module is used for normalizing the characteristic data.

4. The electronic component footprint verification system as claimed in claim 3, wherein the normalizing includes transforming the characteristic data to another format including JSON (JavaScript Object Notation) and XML (Extensible Markup Language).

5. The electronic component footprint verification system as claimed in claim 1, wherein the characteristic data further comprises text description information of the corresponding electronic component footprint, and the pin-out information further includes pin-out names, pin-out coordinates, and pin-out numbers.

6. A method for verifying an electronic component footprint, comprising the following steps:
    selecting an electronic component footprint, which is to be verified and corresponds to file formats of a circuit layout system, from an external user;
    reading a verification rule checklist in an external database, wherein the verification rule checklist includes a pin-out verification rule and an assembly verification rule, the pin-out verification rule is provided for verifying pin-out names, pin-out layers, and pin-to-pin spacings, and the assembly verification rule is provided for verifying total length and width of an assembly;
    providing an application programming interface by which the circuit layout system is accessed;
    extracting characteristic data from the electronic component footprint, wherein the characteristic data comprises pin-out information and geometric pattern information, the pin-out information includes PCB layer sizes and shapes, and the geometric pattern information includes information of pads in each PCB layer and layer data and object attributes of the corresponding circuit layout system; and
    verifying the characteristic data according to the verification rule checklist and displaying a verification result.

7. The method for verifying an electronic component footprint as claimed in claim 6, wherein the verification rule checklist further comprises a silkscreen verification rule, a Dfa (design for assembly) bound verification rule, a place bound verification rule, a body center verification rule, a footprint information verification rule, a sign verification rule, and a keep-out verification rule, the silkscreen verification rule is provided for verifying location of a line segment, a distance between a line segment and a pin-out, safe distance between any two pads of a component, and assembly's identical position, the Dfa bound verification rule is provided for verifying an assembly described and pad areas, the place bound verification rule is provided for verifying height of a component, the body center verification rule is provided for verifying a label at a body center, the footprint information verification rule is provided for verifying correctness of footprint information, the sign verification rule is provided for verifying functional characteristics of a labeled component, and the keep-out verification rule is provided for verifying descriptions of a component for a PCB process.

8. The method for verifying an electronic component footprint as claimed in claim 6, being used for normalizing the characteristic data.

9. The method for verifying an electronic component footprint as claimed in claim 8, wherein the normalizing comprises transforming the characteristic data to another format including JSON (JavaScript Object Notation) and XML (Extensible Markup Language).

10. The method for verifying an electronic component footprint as claimed in claim 6, wherein the characteristic data further comprises text description information of the corresponding electronic component footprint, and the pin-out information further includes pin-out names, pin-out coordinates, and pin-out numbers.

* * * * *

UNITED STATES PATENT AND TRADEMARK OFFICE
CERTIFICATE OF CORRECTION

PATENT NO. : 10,339,263 B2
APPLICATION NO. : 15/671347
DATED : July 2, 2019
INVENTOR(S) : Jiang et al.

Page 1 of 1

It is certified that error appears in the above-identified patent and that said Letters Patent is hereby corrected as shown below:

On the Title Page

Item (72) Inventors, should read:
--(72) Inventors: Yu-Siang Fan Jiang, Kaohsiung (TW);
Mong-Fong Horng, Kaohsiung (TW); Yan-Jhih Wang, Kaohsiung (TW); Jun-Qiang Wei, Kaohsiung (TW); Yi-Ting Chen, Kaohsiung (TW)--.

Signed and Sealed this
Eleventh Day of February, 2020

Andrei Iancu
*Director of the United States Patent and Trademark Office*